United States Patent Office 3,269,988
Patented August 30, 1966

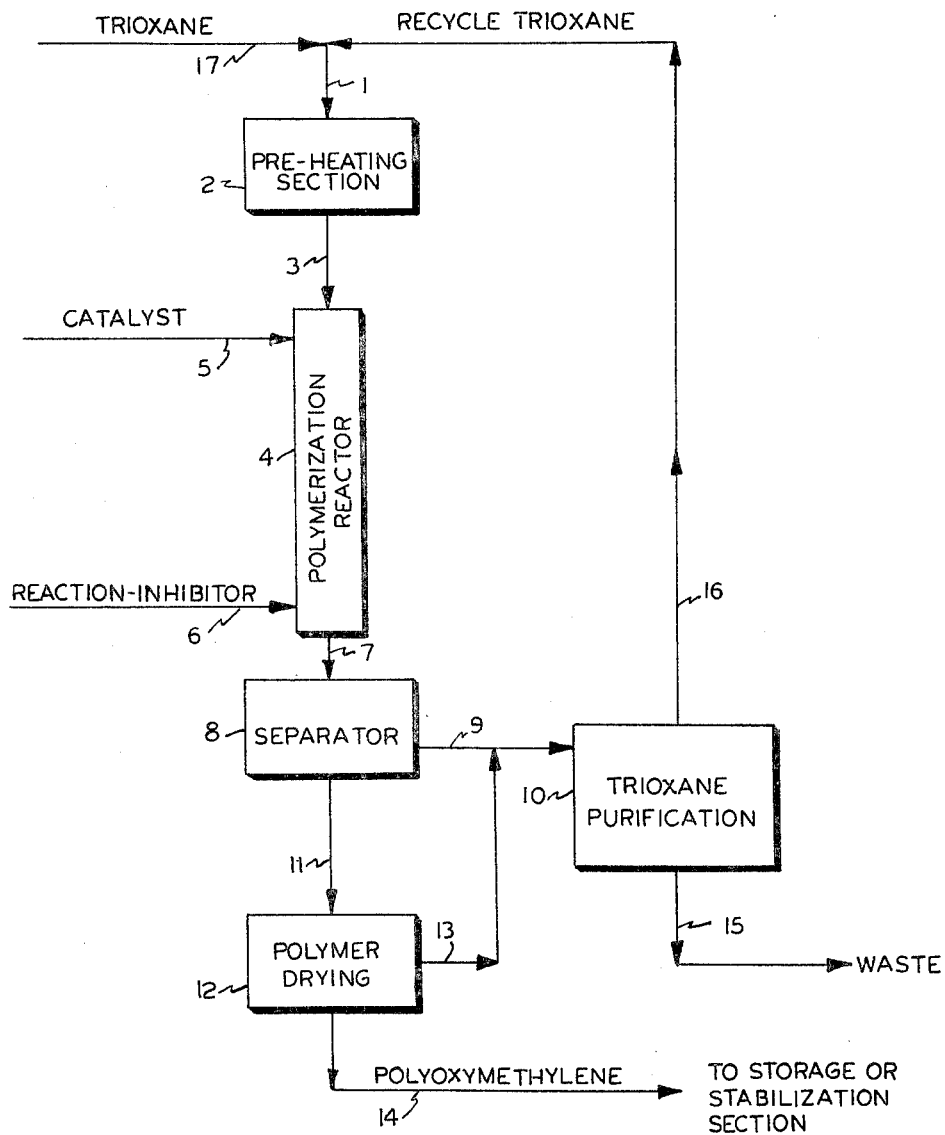

3,269,988
CHEMICAL PROCESS FOR POLYMERIZING TRIOXANE
George L. Braude, North Linthicum, Md., and Melvin C. Molstad, Moylan, Pa., assignors to W. R. Grace & Co., New York, N.Y., a corporation of Connecticut
Filed Mar. 13, 1963, Ser. No. 264,916
5 Claims. (Cl. 260—67)

The present invention relates to the production of polyoxymethylene, and more specifically to an improved method by which trioxane may be polymerized in the presence of a cationic catalyst to form useful high molecular weight polyoxymethylene polymers.

It is well known that trioxane will rapidly polymerize in the presence of a cationic catalyst to form tough high molecular weight polymers. The cationic catalysts which may be used are generally known as Lewis acids, i.e. compounds which are capable of taking up one pair of electrons in an open outer shell of one of their atoms. Typical Lewis acids are boron trifluoride, boron trichloride, aluminum trichloride, ferric trichloride, etc. as well as the ether, thioether, ester and amine complexes thereof.

While Lewis acids are highly effective polymerization catalysts for trioxane, their very effectiveness frequently leads to processing difficulties. For instance, when molten trioxane is subjected to polymerization with boron trifluoride-etherate, polymerization occurs so rapidly that a solid block of polymer is formed within minutes after the catalyst is incorporated in the trioxane. In order to process this polymer block, it must be removed from the apparatus and mechanically broken or ground. This block removal and grinding is frequently difficult and expensive, and discourages the use of efficient continuous polymerization techniques.

It is therefore an object of the present invention to provide an improved method for producing higher polymers of trioxane using cationic catalysts.

It is another object to provide a method by which active Lewis acid catalysts may be used to polymerize trioxane in the molten state without objectionable block formation.

It is a further object to provide a continuous method for polymerizing trioxane into high quality polyoxymethylene polymers using Lewis acid polymerization catalysts which results in the direct formation of a high quality particulate polyoxymethylene polymer.

These and still further objects of the present invention will become more readily apparent to one skilled in the art from the following detailed description and specific examples.

Broadly, the present invention contemplates a method for preparing high molecular weight polyoxymethylene polymers which comprises polymerizing trioxane in the presence of a conventional cationic catalyst, stopping the polymerization reaction short of polymer block formation by the addition of a polymerization inhibiting composition, and recovering the high molecular weight polyoxymethylene polymers from the non-polymerized trioxane in the form of discreet particles. This process may be carried out in a batchwise manner or by a continuous polymerization process as outlined in the accompanying drawing.

More specifically, we have found that if molten trioxane is subjected to an active Lewis acid polymerization catalyst at a temperature in excess of the melting point of trioxane up to about 110° C. for a time sufficient to convert from about 5 to about 50 percent of the trioxane to higher polymers, and then a polymerization inhibitor composition comprising an amine dissolvent in a ketone or alcohol is added to substantially terminate the reaction, a high quality polyoxymethylene polymer may be obtained which is in a convenient easy-to-handle particulate form.

This process may be carried out by a batch operation or more preferably as set out in the drawing, in a continuous polymerization process. Where a continuous process is contemplated, reference to the drawing will show that trioxane conduit 1 will carry the fresh and recycled trioxane to a preheating section 2 wherein the trioxane is heated to above its melting point of 62° C. for injection by way of conduit 3 into an elongated polymerization reactor 4. The polymerization reactor 4 is equipped with a catalyst injecting conduit 5 at the end wherein molten trioxane is admitted. The temperature within the reactor is maintained at the desired reaction temperature of from about 62 to about 110° C.

Near the terminal end of the reactor 4, a polymerization inhibitor conduit 6 is connected in a manner that permits the injection of a desired amount of polymerization inhibitor. At the extreme end of the reactor 4 is a reaction mixture outlet 7 which leads to a separator 8 wherein non-polymerized trioxane is separated from the particulate polyoxymethylene polymer.

Conduit 9 leading from separator 8 carries the non-polymerized trioxane to trioxane purification section 10 wherein excess reaction inhibitor and other possible impurities may be removed from the non-polymerized trioxane. Also leading from separator 8 is conduit 11 which conducts the separated particulate polyoxymethylene polymer into polymer drying section 12, wherein residual amounts of trioxane are separated therefrom. This residual trioxane may be carried by way of conduit 13 which intersects with trioxane conduit 9 to carry the non-polymerized trioxane into the purification section 10.

Subsequent to drying in the drying section 12, polyoxymethylene is conducted by way of conduit 14 to storage or to further processing which may include stabilization and classification.

It is seen that the trioxane purification section 10 contains two outlets. Outlet 15 carries the waste products derived from the purification process to a waste collection and disposal section. Conduit 16 conducts the purified trioxane for recycle into the original polymerization process. Thus it is seen conduit 16 intersects with make-up trioxane conduit 17 to form trioxane conduit 1 which admits the required trioxane into the preheating section.

Operation of the continuous process set forth in the drawing includes preheating the trioxane in preheating section 2 to a desired polymerization temperature of from about 62 to about 110° C. This preheated trioxane is conducted into the polymerization reactor 4 wherein it is immediately admixed with a metered amount of catalyst. The amount of catalyst admixed with the incoming trioxane will be in the ratio of from about 0.00001 to about 0.001 mole of catalyst per mole of trioxane passing through the reactor. The trioxane catalyst mixture is passed through the reactor 4 at a rate which will result in conversion of from about 5 to about 50% of the trioxane to polyoxymethylene polymer by the time it reaches the reaction inhibitor injection point which makes connection with conduit 6. At this point, sufficient reaction inhibitor is added to the polymerizing mass to substantially neutralize the catalyst which was previously injected. This reaction inhibitor is admitted in molar amounts equal to or greater than the molar amount of catalyst which was initially admitted. Normally, from about 1 to about 10 moles of reaction inhibitor is added for each mole of catalyst injected into the system.

After the desired amount of polymerization has taken place in the reactor 4, separation is achieved in separator 8 which may comprise a continuous filter mechanism. Polymer drying in drying section 12 is achieved by heating the polymer to above about 70° C. wherein excess trioxane is evaporated. The trioxane purification normally comprises distilling the impure trioxane to remove the bulk of the impurities followed by possible drying to remove water which may be entrained in the distillation system.

Trioxane which is utilized in the present invention is chemically pure trioxane which does not contain any substantial amounts of alcohols or ketones which may inhibit the initial reaction. Furthermore, it is intended that the trioxane may be combined with relatively minor amounts of copolymerized both cyclic ethers having the general formulae:

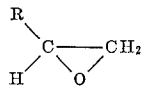

and

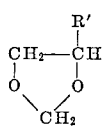

wherein R represents substituted or unsubstituted alkyl, aralkyl, alkaryl or cycloalkyl groups, and R' represents hydrogen, methyl or chloromethyl groups. Possible substituents on R include epoxy, halogen, cyano, nitro, carbalkoxy, and ether groups. Specific examples of such copolymerizable compounds include propylene oxide, ethylene oxide, epichlorohydrin, and dioxolane. Normally, from about 0 to about 5% by weight of these cyclic ethers may be added to the trioxane which is subjected to the polymerizing process set forth herein. Inclusion of minor amounts of these copolymerizable cyclic ethers is found to enhance the physical properties and stability of the final polyoxymethylene polymer in a manner well-known to those skilled in the art.

Catalysts which are used in the practice of the present invention are broadly disclosed as being Lewis acids, that is, molecules which are capable of taking up one pair of electrons in an open outer shell of one of their atoms. Consequently, there may be used compounds which may be regarded as electron acceptors. Specific examples of these compounds are boron trichloride, boron trifluoride, aluminum trichloride, ferric trichloride, antimony trichloride, antimony pentachloride, zinc chloride, cadmium chloride, tin tetrachloride, and titanium tetrachloride. Furthermore, organic complexes of these compounds may be used to conduct the present invention. Particularly effective are the complex addition compounds of boron trifluoride with dimethyl ether, methyl ethyl ether and diethyl ether. Further complexes which may be used are Lewis acids with thioethers, esters, amines, carboxylic acid amides and carboxylic anhydrides.

The temperatures at which the present reaction is carried out are those above the melting point of the trioxane. In general, a temperature range of from about 62 to about 110° C. is found to be entirely adequate. Under these temperatures the trioxane will exert a vapor pressure of from about 100 to about 760 mm. of mercury. Thus the reaction equipment should be designed so that such a vapor pressure may be contained.

At the above stated temperatures the desired polymerization will be achieved in from about 0.05 to about 10 minutes. If a continuous process is contemplated, the reactor is adjusted so that an appropriate residence time of the trioxane in the reactor is selected to obtain the desired percentage conversion.

Normally for the practice of the invention, from about 5 to about 50% conversion of the initial trioxane to high molecular weight polyoxymethylene polymer is desired. Subsequent to the desired conversion to polymer (5 to 50%) a polymerization inhibitor comprising an amine and from about 1 to about 15 parts by weight of a ketone or alcohol is added to the polymerization mixture to substantially terminate the polymerization reaction. Amines which may be used in the present invention are amines wrich contain at least one active hydrogen atom and at least one hydrocarbon substituent containing from about 1 to about 18 carbon atoms. Appropriate amines are primary and secondary amines having the general formulae $$RNH_2 \text{ and } R_2NH$$

In the above formulae R may be an aliphatic substituent such as alkyl and alkenyl having 1 to 18 carbon atoms, or R may represent a cyclic substituent such as cycloalkyl having 4 to 6 carbon atoms. Furthermore, R may represent aromatic substituents such as phnyl and alkyl phenyl wherein the alkyl substituents possess 1 to 12 carbon atoms.

Specific examples of useful amines are methyl and dimethylamines, hexyl amine, hexyldecylamine, phenylamine and diphenylamine. Furthermore, polyamines such as ethylene diamine and hexamethylene diamine may be used with good results.

Ketones which are specifically useful are those having the general formula:

wherein R represents lower alkyl groups having 1 to 3 carbon atoms such as acetone, methyl ethyl ketone, ethyl ketone, and so forth.

Alcohols which may be used have the general formula:

wherein R represents lower alkyl groups having 1 to 6 carbon atoms such as methanol, ethanol, butanol and so forth.

The polymerization inhibitor mixture is added in amounts which are sufficient to substantially terminate the polymerization reaction before solid block formation occurs. Generally, an amount of polymerization inhibitor containing a molar amount of amine equal to the molar amount of catalyst used in the polymerization reactor is entirely sufficient. However, an excess of the polymerization inhibitor may be added without harm. On some occasions, the polymerization inhibitor amine which is in excess of the amount required to neutralize the catalyst will subsequently serve as a stabilization agent for the polyoxymethylene polymer which is obtained. However, if a continuous process is contemplated, care should be taken to remove substantially all the excess polymerization inhibitor from the non-polymerized trioxane. Excess polymerization inhibitor will interfere with the polymerization step.

Subsequent to the completion of the polymerization step the polymer dispersed in unpolymerized trioxane is subjected to a separation operation. This may be conducted in a conventional filter apparatus which maintains the mixture above the melting point of the trioxane monomer. Subsequent to a rough separation of the solid polyoxymethylene polymer from the molten trioxane, the polymer may be subjected to a vacuum drying step wherein the last traces of trioxane is removed by evaporation.

The polyoxymethylene polymers recovered by the practice of the invention may be subjected to conventional stabilization procedures which may involve the incorporation of stabilizing materials such as organic amines (phenyl beta-naphthyl-amine, for example) and/or organic salts such as sodium silicate. These polymers then are ready for further processing steps.

Having described the essential and basic elements of the present invention, the following specific examples are given to illustrate embodiments thereof.

*Example I*

A 350 gram sample of distilled trioxane was melted in a glass flask equipped with a mechanical stirrer, and maintained at a temperature of 70° C. 8.8 grams of epichlorohydrin were added with stirring. 40 mg. of boron trifluoride-ethyl etherate were then injected into the mixture and thoroughly mixed therewith. The mixture became cloudy within one minute and started thickening. 2.5 ml. of a 10% solution of diphenyl amine in acetone were injected rapidly into the mixture. This stopped the polymerization reaction and resulted in a thick slurry of polymer particles suspended in excess molten trioxane. This slurry was filtered at 70° C. by means of a heated filter and the cake was dried under vacuum to remove excess trioxane. 21 grams of polyoxymethylene-epichlorohydrin copolymer was obtained in the form of a fine fluffy powder. The trioxane recovered from the filtrate was purified for further use.

*Example II*

Molten trioxane containing 2.5% by weight epichlorohydrin was continuously fed into a simple tubular reactor maintained at a temperature of 70° C. at a rate of 60 pounds per hour. Immediately inside the reactor liquid boron trifluoride-ethyl etherate was continuously added at a rate of 3.12 grams per hour and thoroughly mixed with the trioxane stream. After a reaction time of about 2 minutes, a 10% by weight solution of dipenylamine in acetone was continuously added to the reaction stream down stream from the catalyst addition point. The acetone diphenylamine mixture was added at a rate of 153 grams per hour. Particles of trioxane-epichlorohydrin copolymer which comprised about 20% by weight of the final stream were removed by passing the stream through a solid-bowl continuous centrifuge. The recovered polymer particles were then passed through a vacuum dryer and thence to a product storage receiver. The unreacted trioxane which was recovered during the filtering and drying step was purified by fractional distillation and recycled into the initial trioxane stream.

*Example III*

To illustrate the problems involved in carrying out a similar polymerization which permits the formation of a block of polymer, the following process was carried out. A 350 gram sample of distilled trioxane was melted in a 1 liter flask equipped with a stirrer. 8.8 grams of epichlorohydrin were added and the temperature of the mixture was adjusted to 70° C. 40 mg. of boron trifluoride-ethyl etherate were then injected into the reaction mass. The product turned cloudy within one minute then thickened and suddenly set up into a solid mass of copolymer. Attempts to remove this material resulted in breaking of the flask. The block of polymer was difficult to grind and hence difficult to purify and stabilize.

*Example IV*

350 grams of distilled trioxane were charged to a one liter glass flask equipped with a mechanical stirrer and maintained at a temperature of 70° C. 20 milligrams of boron trifluoride-ethyl etherate were added to the liquid, which was thoroughly agitated. The mixture became cloudy within 0.5 minute and started thickening. When agitation became difficult, 1.5 milliliters of a 10% solution of diphenyl amine in acetone were then injected rapidly. This interrupted the polymerzation. The slurry containing polyoxymethylene in excess trioxane was filtered at 70° C. and the cake dried under vacuum to remove excess trioxane, yielding 38 grams of polyoxymethylene as a fine white powder.

*Example V*

350 grams of molten trioxane were maintained at 70° C. in a stirred glass reactor. 25 milligrams of boron trifluoride-ethyl etherate were added with constant stirring. When the mixture became thick, 2.0 milliliters of a 5% solution of diphenyl amine in ethyl alcohol were then injected rapidly into the mixture. This essentially stopped the polymerization reaction. The slurry obtained was worked up as described in Example I, yielding 48 grams of polyoxymethylene as a fine fluffy powder.

The above specific examples clearly illustrate that useful particulate polyoxymethylene polymers and copolymers may be conveniently prepared by the process set forth herein.

We claim:

1. In the process for polymerizing molten trioxane in the presence of a Lewis acid trioxane polymerization catalyst to obtain a high molecular weight polyoxymethylene polymer the improvement which comprises: carrying the polymerization to from about 5 to about 50% conversion of said trioxane to polymer; substantially terminating the polymerization by the addition of a polymerization inhibitor composition comprising (1) a compound selected from the group consisting of

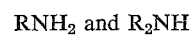

wherein R is selected from the group consisting of alkyl and alkenyl having 1 to 18 carbon atoms, cycloalkyl having 4 to 6 carbon atoms, phenyl and alkylphenyl wherein the alkyl substituent possesses 1 to 12 carbon atoms and (2) a compound selected from the group comprising

and

wherein R' represents lower alkyl; and recovering high-molecular-weight polyoxymethene polymer from the non-polymerized trioxane.

2. The process of claim 1 wherein said unpolymerized trioxane is purified to remove polymerization inhibitor, and then recycled for further polymerization.

3. The process of claim 2 wherein from about 1 to about 10 moles of the inhibitor composition based on amine contact is added per mole of Lewis acid trioxane polymerization catalyst present.

4. The process of claim 3 wherein the inhibitor composition contains from about 1 to about 15 parts by weight of the member selected from the group consisting of ketones and alcohols per part amine.

5. The process of claim 4 wherein the inhibitor composition comprises diphenylamine and acetone.

References Cited by the Examiner

UNITED STATES PATENTS

| | | | |
|---|---|---|---|
| 2,174,527 | 10/1939 | Peterson | 260—78 |
| 2,174,761 | 10/1939 | Schuette et al. | 260—2 |
| 2,237,092 | 4/1941 | Swain et al. | 260—67 |
| 2,394,910 | 2/1946 | Gresham | 260—2 |
| 2,792,375 | 5/1957 | Bartleson | 260—2 |
| 2,989,509 | 6/1961 | Hudgin et al. | 260—67 |
| 3,000,861 | 9/1961 | Brown et al. | 260—67 |
| 3,017,389 | 1/1962 | Langsdorf et al. | 260—67 |

WILLIAM H. SHORT, *Primary Examiner.*

L. M. MILLER, *Assistant Examiner.*